United States Patent
Kamiya

(10) Patent No.: US 8,349,973 B2
(45) Date of Patent: *Jan. 8, 2013

(54) THERMOSETTING EPOXY RESIN COMPOSITION

(75) Inventor: Kazunobu Kamiya, Tochigi (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 292 days.

This patent is subject to a terminal disclaimer.

(21) Appl. No.: 12/734,291

(22) PCT Filed: Oct. 22, 2008

(86) PCT No.: PCT/JP2008/069085
§ 371 (c)(1),
(2), (4) Date: Apr. 22, 2010

(87) PCT Pub. No.: WO2009/093364
PCT Pub. Date: Jul. 30, 2009

(65) Prior Publication Data
US 2010/0249338 A1    Sep. 30, 2010

(30) Foreign Application Priority Data

Jan. 25, 2008   (JP) .................. 2008-014427
Feb. 26, 2008   (JP) .................. 2008-044587

(51) Int. Cl.
*C08G 18/04*   (2006.01)
*C08L 63/02*   (2006.01)
(52) U.S. Cl. .................. 525/528; 521/155; 521/159
(58) Field of Classification Search .................. None
See application file for complete search history.

(56) References Cited

U.S. PATENT DOCUMENTS

| 4,599,155 A * | 7/1986 | Suzuki et al. ............ 522/8 |
| 8,198,342 B2 * | 6/2012 | Kamiya .................. 521/110 |
| 2005/0244649 A1 * | 11/2005 | Kashiwagi et al. ........ 428/413 |
| 2007/0010636 A1 | 1/2007 | Kamiya et al. |

FOREIGN PATENT DOCUMENTS

| JP | 62-227923 A | * | 10/1987 |
| JP | A-62-227923 |   | 10/1987 |
| JP | A-08-319342 |   | 12/1996 |
| JP | A-09-100349 |   | 4/1997 |
| JP | A-2002-212537 |   | 7/2002 |
| JP | 2005-75892 A | * | 3/2005 |
| JP | A-2006-070051 |   | 3/2006 |
| JP | A-2007-211056 |   | 8/2007 |
| TW | 200517463 A |   | 6/2005 |
| WO | WO 2006/132133 A1 |   | 12/2006 |
| WO | WO 2008/090719 A1 |   | 7/2008 |

* cited by examiner

*Primary Examiner* — Robert Sellers
(74) *Attorney, Agent, or Firm* — Oliff & Berridge, PLC

(57) ABSTRACT

A thermosetting epoxy resin composition can be cured rapidly at low temperature with an aluminum chelate-based latent curing agent without the use of a cycloaliphatic epoxy compound. The thermosetting epoxy resin composition includes an aluminum chelate-based latent curing agent, a silanol compound of the formula (A), and a glycidyl ether-type epoxy resin:

$$(Ar)_m Si(OH)_n \qquad (A)$$

wherein Ar is an optionally substituted aryl group, and m is 2 or 3, provided that the sum of m and n is 4. Examples of the silanol compound of the formula (A) include triphenylsilanol, diphenylsilanol, and the like.

8 Claims, 3 Drawing Sheets

THERMOSETTING EPOXY RESIN COMPOSITION

TECHNICAL FIELD

The present invention relates to a thermosetting epoxy resin composition containing an aluminum chelate-based curing agent and a glycidyl ether-type epoxy resin.

BACKGROUND ART

Patent Document 1 proposes, as a curing agent exhibiting low-temperature fast-curing activity for an epoxy resin, a microcapsulated aluminum chelate-based latent curing agent in which an aluminum chelate agent is held in a porous resin obtained by interfacial polymerization of a polyfunctional isocyanate compound. Patent Document 1 also proposes a thermosetting epoxy resin composition prepared by adding to the aluminum chelate-based latent curing agent an epoxy resin and a silane coupling agent having a trialkoxy group and a polymerizable group such as a vinyl group. It is stated that, although this thermosetting epoxy resin composition is of the one-component type, the resin composition is excellent in storage stability and has the property of rapidly curing at low-temperature through cationic polymerization.

[Patent Document 1] Japanese Patent Application Laid-Open No. 2006-70051.

DISCLOSURE OF THE INVENTION

Problems to be Solved by the Invention

However, with a thermosetting epoxy resin composition containing the aluminum chelate-based latent curing agent disclosed in Patent Document 1, a silane coupling agent and an epoxy resin, a problem may arise in that, when the polymerization (curing) reaction is initiated by heating, silanolate anions generated from the silane coupling agent are added to the β position carbon atoms of the epoxy groups of the epoxy resin, causing polymerization termination reaction. The addition reaction to the β carbon atoms occurs easily in glycidyl ether-based epoxy resins, so that with the aluminum chelate-based latent curing agent disclosed in Patent Document 1, such glycidyl ether-based epoxy resins are difficult to polymerize without causing polymerization termination reaction. Therefore, disadvantageously, a cycloaliphatic epoxy compound must be used which is less likely to undergo the addition reaction of the silanolate anions to the β position carbon atoms but requires high manufacturing cost.

It is an object of the present invention to solve the problems associated with the conventional technology. More specifically, the object of the invention is to avoid using a cycloaliphatic epoxy compound and to enable a glycidyl ether-based epoxy resin to rapidly cure at low temperature with an aluminum chelate-based latent curing agent.

Means for Solving the Problems

The present inventor has found that, when a silanol compound having a specific chemical structure and high steric hindrance, which is not conventionally used as a silane coupling agent, is used together with an aluminum chelate-based latent curing agent, the specific silanol compound unexpectedly suppresses polymerization termination reaction and facilitates the formation of a cationic catalyst, and therefore the above object can be achieved. Thus, the present invention has been completed.

Accordingly, the present invention provides a thermosetting epoxy resin composition containing an aluminum chelate-based latent curing agent, a silanol compound of the formula (A), and a glycidyl ether-type epoxy resin:

$$(Ar)_m Si(OH)_n \qquad (A)$$

wherein Ar is an optionally substituted aryl group, and m is 2 or 3, provided that the sum of m and n is 4.

Effects of the Invention

The thermosetting epoxy resin composition of the present invention containing a glycidyl ether-type epoxy resin, which is considered not to be sufficiently cured with an aluminum chelate-based latent curing agent, contains a specific silanol compound having high steric hindrance in addition to an aluminum chelate-based latent curing agent. Therefore, the polymerization termination reaction can be suppressed, and the formation of a cationic catalyst can be facilitated. Accordingly, although the thermosetting epoxy resin composition of the present invention contains the glycidyl ether-type epoxy resin, the resin composition can be rapidly cured with the aluminum chelate-based latent curing agent at low temperature.

BEST MODE FOR CARRYING OUT THE INVENTION

Figure 1:
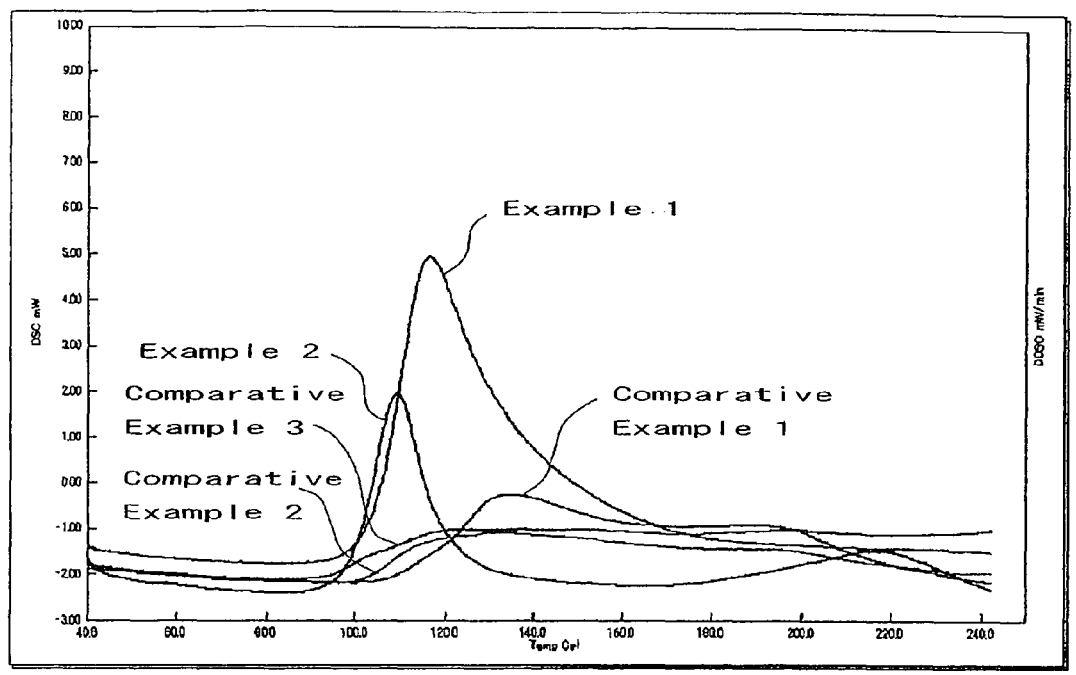
FIG. 1 shows the results of DSC measurement of the thermosetting epoxy resin compositions of Examples 1 and 2 and Comparative Examples 1 to 3.

A thermosetting epoxy resin composition of the present invention contains an aluminum chelate-based latent curing agent, a silanol compound and a glycidyl ether-type epoxy resin. The silanol compound is different from a conventional silane coupling agent having a trialkoxy group and is an arylsilanol having a chemical structure represented by the following formula (A):

$$(Ar)_m Si(OH)_n \qquad (A)$$

wherein m is 2 or 3, provided that the sum of m and n is 4. Therefore, the silanol compound of the formula (A) is a monool or diol. "Ar" is an optionally substituted aryl group. Examples of the aryl group include a phenyl group, a naphthyl group, an anthracenyl group, an azulenyl group, a fluorenyl group, a thienyl group, a furyl group, a pyrrolyl group, an imidazolyl group, a pyridyl group, and the like. Of these, a phenyl group is preferred in terms of availability and cost. The m Ar groups may be the same or different but are preferably the same in terms of the ease of availability.

These aryl groups may have 1 to 3 substituents. Examples of the substituents include: electron-withdrawing groups such as halogens (such as chlorine and bromine), trifluoromethyl, nitro, sulfo, alkoxy carbonyls (such as carboxyl, methoxycarbonyl, and ethoxycarbonyl), and formyl; and electron-releasing groups such as alkyls (such as methyl, ethyl, and propyl), alkoxys (such as methoxy and ethoxy), hydroxy, amino, monoalkylaminos (such as monomethylamino), and dialkylaminos (such as dimethylamino). When an electron-withdrawing group is used as the substituent, the acidity of the hydroxyl groups of the silanol can be increased. In contrast, when an electron-releasing group is used as the substituent, the acidity can be reduced. Therefore, the curing activity can be controlled. The substituents may be different for each of these m Ar groups. However, in terms of the ease of availability, it is preferable that the substituents of the m Ar groups be the same. Moreover, only some of the Ar groups may have a substituent, and the rest may not have any substituent.

Preferred examples of the silanol compound of the formula (A) include triphenylsilanol and diphenylsilanol. Of these, triphenylsilanol is particularly preferred.

In the thermosetting epoxy resin composition of the present invention, when the ratio of the amount of the silanol compound of the formula (A) to the total amount of the silanol compound and the glycidyl ether-type epoxy resin is too small, the degree of curing is insufficient. When the ratio is too large, the properties of the resin (such as flexibility) are reduced. Therefore, the ratio of the amount of the silanol compound is preferably in the range of from 5 mass % to 30 mass %, and more preferably in the range of from 5 mass % to 20 mass %.

The glycidyl ether-type epoxy resin constituting the thermosetting epoxy resin composition of the present invention is used as a film-forming component. Such a glycidyl ether-type epoxy resin may be in a liquid form or a solid form. A glycidyl ether-type epoxy resin having an epoxy equivalent of normally about 100 to about 4000 and having two or more epoxy groups in the molecule is preferred. Examples of such an epoxy resin include bisphenol A-type epoxy resins, phenol novolac-type epoxy resins, cresol novolac-type epoxy resins, ester-type epoxy resins, and the like. Of these, bisphenol A-type epoxy resins can be preferably used because of their resin properties. Such epoxy resins also include monomers and oligomers.

The thermosetting epoxy resin composition of the present invention may also contain as an additional resin component a cycloaliphatic epoxy compound or the like, in addition to the glycidyl ether-type epoxy resin. Moreover, the thermosetting epoxy resin composition may also contain an oxetane compound in order to obtain a sharp exothermic peak. Preferred examples of the oxetane compound include 3-ethyl-3-hydroxymethyloxetane, 1,4-bis{[(3-ethyl-3-oxetanyl)methoxy]methyl}benzene, 4,4'-bis[(3-ethyl-3-oxetanyl)methoxymethyl]biphenyl, 1,4-benzendicarboxylic acid bis[(3-ethyl-3-oxetanyl)]methyl ester, 3-ethyl-3-(phenoxymethyl)oxetane, 3-ethyl-3-(2-ethylhexyloxymethyl)oxetane, di[1-ethyl(3-oxetanyl)]methyl ether, 3-ethyl-3-{[3-(triethoxysilyl)propoxy]methyl}oxetane, oxetanyl silsesquioxane, phenol novolac oxetane and the like. When an oxetane compound is used, the amount of use is preferably in the range of from 10 parts by mass to 100 parts by mass, and more preferably in the range of from 20 parts by mass to 70 parts by mass, based on 100 parts by mass of the epoxy resin.

Any aluminum chelate-based curing agent to which latency properties are imparted by a known method such as a microcapsulation method may be used as the aluminum chelate-based latent curing agent constituting the thermosetting epoxy resin composition of the present invention. Preferred examples of the aluminum chelate-based latent curing agent include a latent curing agent in which an aluminum chelate agent is held in a porous resin obtained by interfacial polymerization of a polyfunctional isocyanate compound. More specifically, such an aluminum chelate-based latent curing agent is not a microcapsulated latent curing agent having a simple structure in which the core of an aluminum chelate-based curing agent is covered with a porous resin shell, but is, for example, a latent curing agent having a structure in which an aluminum chelate agent is held in a large number of microscopic pores present in a porous resin matrix. Hereinafter, a description will be given of such an aluminum chelate-based latent curing agent.

The aluminum chelate-based latent curing agent is produced using an interfacial polymerization method and therefore has a spherical shape. In terms of curing and dispersion properties, it is preferable that the particle size be in the range of from 0.5 μm to 100 μn. In terms of curing and latency properties, it is preferable that the pore size be in the range of from 5 nm to 150 nm.

When the degree of crosslinking of the porous resin used in the aluminum chelate-based latent curing agent is too small, the latency properties of the latent curing agent tend to be reduced. When the degree of crosslinking is too large, the thermal response properties tend to be reduced. Therefore, it is preferable to use a porous resin having a degree of crosslinking controlled according to the intended purpose. The degree of crosslinking of the porous resin can be measured by a micro-compression test.

It is preferable in terms of curing stability that the aluminum chelate-based latent curing agent contains substantially no organic solvent used for interfacial polymerization, and more specifically contains an organic solvent in an amount of 1 ppm or less.

When the amount of the aluminum chelate agent contained in the aluminum chelate-based latent curing agent is too small, the thermal response properties thereof are reduced. When the amount is too large, the latency properties thereof are reduced. Therefore, the amount of the aluminum chelate agent is preferably in the range of from 10 parts by mass to 200 parts by mass, and more preferably in the range of from 10 parts by mass to 150 parts by mass, based on 100 parts by mass of the porous resin contained in the aluminum chelate-based latent curing agent.

Examples of the aluminum chelate agent in the aluminum chelate-based latent curing agent include a complex compound represented by the formula (1) in which three β-ketoenolate anions are coordinated to aluminum.

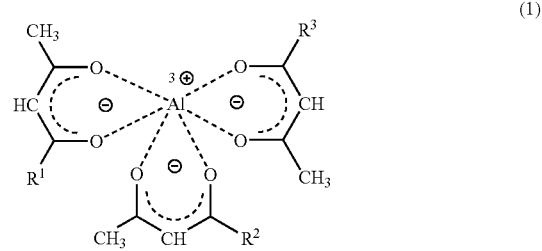

(1)

Here, $R^1$, $R^2$, and $R^3$ are each independently an alkyl group or an alkoxyl group. Examples of the alkyl group include a methyl group, an ethyl group, and the like. Examples of the alkoxyl group include a methoxy group, an ethoxy group, an oleyloxy group, and the like.

Specific examples of the aluminum chelate agent represented by the formula (1) include aluminum tris(acetylacetonate), aluminum tris(ethylacetoacetate), aluminum monoacetylacetonate bis(ethylacetoacetate), aluminum monoacetylacetonate bisoleylacetoacetate, ethylacetoacetate aluminum diisopropylate, alkylacetoacetate aluminum diisopropylate, and the like.

The polyfunctional isocyanate compound contains in its molecule preferably 2 or more isocyanate groups and more preferably 3 or more isocyanate groups. Preferred examples of the trifunctional isocyanate compound include: a TMP adduct of the formula (2) prepared by reacting 1 mole of trimethylol propane with 3 moles of a diisocyanate compound; an isocyanurate compound of the formula (3) prepared by self-condensation of 3 moles of a diisocyanate compound; and a biuret compound of the formula (4) prepared by using 3 moles of a diisocyanate compound and condensing diisocyanate urea that is obtained from 2 moles of the diisocyanate compound with the remaining 1 mole of the diisocyanate compound.

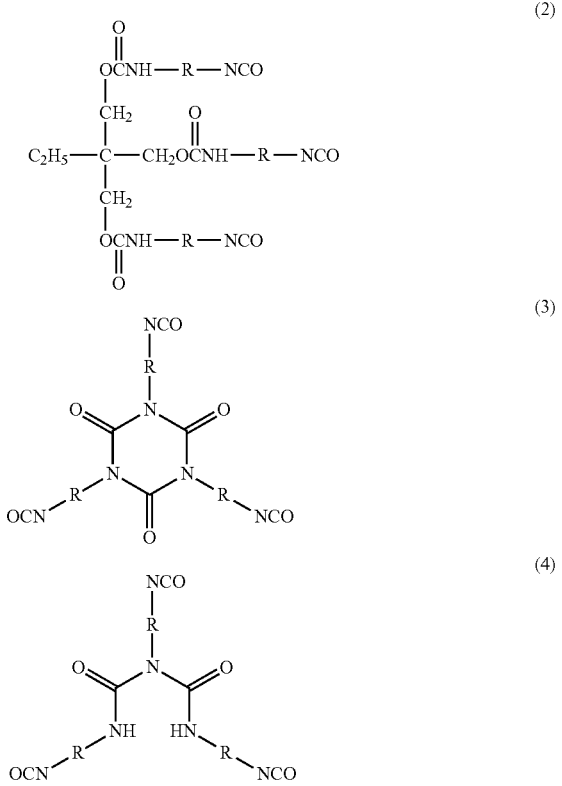

In the formulas (2) to (4) above, the substituent R is a part of the diisocyanate compound excluding the isocyanate groups. Specific examples of such a diisocyanate compound include toluene-2,4-diisocyanate, toluene-2,6-diisocyanate, m-xylylene diisocyanate, hexamethylene diisocyanate, hexahydro-m-xylylene diisocyanate, isophorone diisocyanate, methylenediphenyl-4,4'-diisocyanate, and the like.

The porous resin obtained by interfacial polymerization of the polyfunctional isocyanate compound is porous polyurea. During the interfacial polymerization, a part of the isocyanate groups are hydrolyzed to form amino groups, and the formed amino groups are reacted with the isocyanate groups to form urea bonds, whereby the isocyanate compound is polymerized. When the aluminum chelate-based latent curing agent composed of the porous resin and the aluminum chelate agent held in the pores of the porous resin is heated for curing, the held aluminum chelate agent is allowed to come into contact with the silanol compound of formula (A) and the thermosetting resin that coexist with the latent curing agent, although the reason for this is unclear. Accordingly, the curing reaction is allowed to proceed.

When subjected to interfacial polymerization, the polyfunctional isocyanate compound may be copolymerized with radical polymerizable monomers such as divinylbenzene in the presence of a radical polymerization initiator to improve the mechanical properties of the microcapsule walls. In this manner, the thermal response rate of the epoxy resin at the time of curing can be increased.

The aluminum chelate agent may be present on the surface of the aluminum chelate-based latent curing agent because of its structure. However, the aluminum chelate agent present on the surface may be inactivated by water present in the system used for interfacial polymerization, and only the aluminum chelate agent held inside the porous resin may retain the activity. For the above reason, the resultant curing agent exhibits latency properties.

The aluminum chelate-based latent curing agent can be manufactured by a manufacturing method characterized by dissolving the aluminum chelate agent and the polyfunctional isocyanate compound in a volatile organic solvent, adding the obtained solution to an aqueous phase containing a dispersant, and subjecting the resultant solution to interfacial polymerization by heating and stirring.

In this manufacturing method, first, the aluminum chelate agent and the polyfunctional isocyanate compound are dissolved in a volatile organic solvent to prepare a solution serving as an oil phase during interfacial polymerization. The reason for using the volatile organic solvent is as follows. When a high-boiling point solvent having a boiling point of more than 300° C., which is used in a general interfacial polymerization method, is used, the organic solvent is not volatilized during interfacial polymerization. Therefore, the contact probability between isocyanate and water is not increased, and the interfacial polymerization of the isocyanate compound does not proceed to a sufficient extent. Accordingly, after interfacial polymerization, the polymerized product may not have good shape-retaining properties. Even when a polymerized product having good shape-retaining properties is obtained, the high-boiling point solvent remains held in the polymerized product. In such a case, when the polymerized product is used in a thermosetting resin composition, the high-boiling point solvent adversely affects the properties of the cured product of the thermosetting resin composition. Therefore, in this manufacturing method, a volatile organic solvent is used as the organic solvent used to prepare the oil phase.

A preferred volatile organic solvent is a good solvent for the aluminum chelate agent and also for the polyfunctional isocyanate compound (the solubility thereof in the solvent is preferable 0.1 g/mL (organic solvent) or more), does not substantially dissolve in water (the solubility of water in the solvent is 0.5 g/mL (organic solvent) or less), and has a boiling point of 100° C. or less under atmospheric pressure. Specific examples of such a volatile organic solvent include alcohols, acetic esters, ketones, and the like. Of these, ethyl acetate is preferred because of its high polarity, low boiling point, and low solubility in water.

When the amount of the volatile organic solvent used is too small, the latency properties are reduced. When the amount is too large, the thermal response properties are reduced. Therefore, the amount of the volatile organic solvent is preferably in the range of from 100 parts by mass to 500 parts by mass based on 100 parts by mass of the total amount of the aluminum chelate agent and the polyfunctional isocyanate compound.

The viscosity of the solution serving as the oil phase can be reduced, for example, by using a relatively large amount of the volatile organic solvent within the above range of the amount of use. By reducing the viscosity, the efficiency of stirring is improved, so that the oil phase particles in the reaction system can be reduced in size and homogenized. In this manner, the size of the resulting latent curing agent particles can be controlled to the submicron to micron level, and a mono-dispersed particle size distribution can be obtained. The viscosity of the solution serving as the oil phase is set to preferably in the range of from 1 mPa·s to 2.5 mPa·s.

If PVA is used for emulsification and dispersion of the polyfunctional isocyanate compound, the hydroxyl groups of PVA react with the polyfunctional isocyanate compound. In such a case, byproducts may act as foreign substances adhering to the peripheries of the latent curing agent particles, and the shape of the particles may be deformed. To prevent these phenomena, for example, the reactivity of the polyfunctional isocyanate compound with water is increased, or the reactivity of the polyfunctional isocyanate compound with PVA is suppressed.

To increase the reactivity of the polyfunctional isocyanate compound with water, the amount of the aluminum chelate agent used is set to preferably one-half or less and more preferably one-third or less of the weight of the polyfunctional isocyanate compound. In this manner, the contact probability between the polyfunctional isocyanate compound and water is increased, so that the polyfunctional isocyanate compound is easily reacted with water before PVA comes into contact with the oil phase particle surface.

To suppress the reactivity of the polyfunctional isocyanate compound with PVA, for example, the amount of the aluminum chelate agent used in the oil phase is increased. More specifically, the amount of the aluminum chelate agent used is set to preferably equal to or greater than and more preferably 1.0 to 2.0 times the weight of the polyfunctional isocyanate compound. In this manner, the concentration of isocyanate on the oil phase particle surface is reduced. In addition, since the reaction (interfacial polymerization) rate of the polyfunctional isocyanate compound with amine formed by hydrolysis is greater than the reaction rate with the hydroxy groups, the reaction probability of the polyfunctional isocyanate compound with PVA can be reduced.

The aluminum chelate agent and the polyfunctional isocyanate compound may be dissolved in the volatile organic solvent by simply mixing and stirring at room temperature under atmospheric pressure. If necessary, the mixing and stirring may be performed under heating.

Subsequently, in this manufacturing method, the oil phase solution prepared by dissolving the aluminum chelate agent and the polyfunctional isocyanate compound in the volatile organic solvent is added to an aqueous phase containing a dispersant, and the mixture is subjected to interfacial polymerization by heating and stirring. Any dispersant, such as polyvinyl alcohol, carboxymethylcellulose, gelatin or the like, used in a general interfacial polymerization method may be used as the dispersant. The amount of the dispersant used in the aqueous phase is typically in the range of from 0.1 mass % to 10.0 mass % of the aqueous phase.

When the amount of the oil phase solution added to the aqueous phase is too small, the oil phase is polydispersed. When the amount is too large, the size of the oil phase particles is reduced, so that coagulation occurs. Therefore, the amount of the oil phase solution is preferably in the range of from 5 parts by mass to 50 parts by mass based on 100 parts by mass of the aqueous phase.

The emulsification conditions during interfacial polymerization are, for example, as follows. The mixture is heated and stirred under the typical conditions of a temperature of 30 to 80° C., atmospheric pressure, and a stirring time of 2 to 12 hours such that the size of the oil phase is preferably 0.5 μm to 100 μm (stirring apparatus: homogenizer, stirring rate: 8000 rpm or more).

After completion of interfacial polymerization, the polymerized fine particles are collected by filtration and air dried, whereby an aluminum chelate-based latent curing agent that can be used in the present invention can be obtained. The curing properties of the aluminum chelate-based latent curing agent can be controlled by changing the type and amount used of the polyfunctional isocyanate compound, the type and amount used of the aluminum chelate agent, and the interfacial polymerization conditions. For example, the curing temperature can be reduced by reducing the polymerization temperature. On the contrary, the curing temperature can be increased by increasing the polymerization temperature.

When the amount of the aluminum chelate-based latent curing agent used in the thermosetting epoxy resin composition of the present invention is too small, the resin composition is not sufficiently cured. When the amount is too large, the resin characteristics (for example, flexibility) of the cured product of the resin composition are reduced. Therefore, the amount of the aluminum chelate-based latent curing agent is in the range of from 1 part by mass to 70 parts by mass, and preferably in the range of from 1 part by mass to 50 parts by mass, based on 100 parts by mass of the glycidyl ether-type epoxy resin composition.

The aluminum chelate-based curing agent may be one in which the aluminum chelate agent is held in a porous resin obtained by interfacial polymerization of the polyfunctional isocyanate compound or in a porous resin obtained by interfacial polymerization of the polyfunctional isocyanate compound and radical polymerization of divinylbenzene simultaneously. In such a case, the aluminum chelate-based curing agent may be impregnated with the silanol compound of the formula (A) to improve the low-temperature fast-curing properties. The impregnation may be performed by, for example, the following method. The aluminum chelate-based latent curing agent composed of the aluminum chelate-based curing agent held in such a porous resin is dispersed in an organic solvent (for example, ethanol). Subsequently, the silanol compound of the formula (A) (for example, triphenylsilanol) and, if necessary, the aluminum chelate-based curing agent (for example, a solution of monoacetylacetonate bis(ethylacetoacetate) in isopropanol) are added to the prepared dispersion, and the mixture is stirred at room temperature to about 50° C. for several hours or overnight.

If necessary, the thermosetting epoxy resin composition of the present invention may contain, in addition to the silanol compound of the formula (A), a silane coupling agent, a filler such as silica or mica, a pigment, an antistatic agent, and the like.

As described in paragraphs 0007 to 0010 of Japanese Patent Application Laid-Open No. 2002-212537, a silane coupling agent has a function of initiating cationic polymerization of a thermosetting resin (for example, a thermosetting epoxy resin) when used together with an aluminum chelate agent. Therefore, the co-presence of a small amount of such a silane coupling agent can effectively facilitate the curing of the epoxy resin. Such a silane coupling agent has 1 to 3 lower alkoxy groups in its molecule and may have in its molecule a group reactive with the functional groups of the thermosetting resin. Examples of such a reactive group include a vinyl group, a styryl group, an acryloyloxy group, a methacryloyloxy group, an epoxy group, an amino group, a mercapto group, and the like. Since the latent curing agent used in the present invention is a cationic curing agent, a coupling agent having an amino or mercapto group may be used when the amino or mercapto group does not substantially capture the generated cationic species.

Specific examples of such a silane coupling agent include vinyl tris(β-methoxyethoxy)silane, vinyltriethoxysilane, vinyltrimethoxysilane, γ-styryltrimethoxysilane, γ-methacryloxypropyltrimethoxysilane, γ-acryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, and the like.

In the case where a small amount of the silane coupling agent is used together, when the amount of the silane coupling agent added is too small, the effect of the addition is not expected. When the amount is too large, silanolate anions generated from the silane coupling agent cause polymerization termination reaction. Therefore, the amount of the silane coupling agent is in the range of from 1 part by mass to 300 parts by mass, and preferably in the range of from 1 part by mass to 100 parts by mass, based on 100 parts by mass of the aluminum chelate-based latent curing agent.

The thermosetting epoxy resin composition of the present invention can be manufactured by uniformly mixing and stirring, according to routine methods, the aluminum chelate-based latent curing agent, the silanol compound of the formula (A), the glycidyl ether-type epoxy resin, and if necessary, other additives. The aluminum chelate-based latent curing agent and the silanol compound of the formula (A) may not be mixed separately, and an aluminum chelate-based latent curing agent impregnated with the silanol compound of the formula (A) may be used. Impregnation may be performed using, for example, a method in which the aluminum chelate-based latent curing agent is dispersed in and mixed with a solution of the silanol of the formula (A) in an alcohol (such as ethanol or propanol) for several hours. After mixing, the product is removed from the solution and dried.

The thus-obtained thermosetting epoxy resin composition of the present invention uses an aluminum chelate-based latent curing agent as a curing agent. Therefore, although the thermosetting epoxy resin composition is of the one-component type, this resin composition has excellent storage stability. Although the thermosetting epoxy resin composition contains a glycidyl ether-based epoxy resin, which cannot be sufficiently cured with an aluminum chelate-based latent curing agent, the resin composition contains a specific silanol having high steric hindrance. Therefore, the thermosetting epoxy resin composition can be cationically polymerized rapidly at low temperature.

Hereinafter, the present invention will be specifically described.

REFERENCE EXAMPLE 1

Production of Aluminum Chelate-Based Latent Curing Agent

A 3-liter interfacial polymerization vessel equipped with a thermometer was charged with 800 parts by mass of distilled water, 0.05 parts by mass of a surfactant (NEWREX R-T, NOF Corporation), and 4 parts by mass of polyvinyl alcohol (PVA-205, KURARAY Co., Ltd.) serving as a dispersant, and the mixture was uniformly mixed. Subsequently, an oil phase solution was prepared by dissolving, in 100 parts by mass of ethyl acetate, 100 parts by mass of a 24% solution of aluminum monoacetylacetonate bis(ethylacetoacetate) in isopropanol (Alumichelate D, Kawaken Fine Chemicals Co., Ltd.), 70 parts by mass of a trimethylolpropane (1 mole) adduct of methylene diphenyl-4,4'-diisocyanate (3 moles) (D-109, Mitsui Chemicals, Inc.), 30 parts by mass of divinylbenzene (Merck), and 0.30 parts by mass of a radical polymerization initiator (PEROYL L, NOF Corporation). Then, the oil phase solution was added to the prepared mixture. The resultant mixture was emulsified and mixed in a homogenizer (10000 rpm/5 minutes) and then subjected to interfacial polymerization at 80° C. for 6 hours.

After completion of the reaction, the polymerized mixture was allowed to cool to room temperature, and the interfacial polymerized particles were collected by filtration and air dried, whereby 100 parts by mass of an aluminum chelate-based latent curing agent was obtained as spherical particles having a diameter of about 2 μm.

REFERENCE EXAMPLE 2

Production of Aluminum Chelate-Based Latent Curing Agent

A 3-liter interfacial polymerization vessel equipped with a thermometer was charged with 800 parts by mass of distilled water, 0.05 parts by mass of a surfactant (NEWREX R-T, NOF Corporation), and 4 parts by mass of polyvinyl alcohol (PVA-205, KURARAY Co., Ltd.) serving as a dispersant, and the mixture was uniformly mixed. Subsequently, an oil phase solution was prepared by dissolving, in 30 parts by mass of ethyl acetate, 11 parts by mass of a 24. % solution of aluminum monoacetylacetonate bis(ethylacetoacetate) in isopropanol (Alumichelate D, Kawaken Fine Chemicals Co., Ltd.) and 11 parts by mass of a trimethylolpropane (1 mole) adduct of methylene diphenyl-4,4'-diisocyanate (3 moles) (D-109, Mitsui Chemicals, Inc.). Then, the oil phase solution was added to the prepared mixture. The resultant mixture was emulsified and mixed in a homogenizer (11000 rpm/10 minutes) and subjected to interfacial polymerization at 60° C. overnight.

After completion of the reaction, the polymerized mixture was allowed to cool to room temperature, and the interfacial polymerized particles were collected by filtration and air dried, whereby 20 parts by mass of an aluminum chelate-based latent curing agent was obtained as spherical particles having a diameter of about 2 μm.

EXAMPLES 1 AND 2 AND COMPARATIVE EXAMPLES 1 TO 3

10 parts by mass of the aluminum chelate-based latent curing agent of Reference Example 1, 10 parts by mass of one of the silanol compounds listed in Table 1, and 90 parts by mass of bisphenol A-type epoxy resin (EP828, Japan Epoxy Resins Co., Ltd.) were uniformly mixed to prepare a thermosetting epoxy resin composition. Of the listed silanol compounds, triphenylsilanol was dissolved in the bisphenol A-type epoxy resin under heating at 80° C. for 2 hours before use.

Each of the obtained thermosetting epoxy resin compositions was subjected to thermal analysis using a differential thermal analyzer (DSC) (DSC6200, Seiko Instruments Inc.).

The results obtained are shown in Table 1 and FIG. 1. A description of the curing characteristics of the aluminum chelate-based latent curing agent is given below. Exothermic onset temperature means the initiation temperature of curing, and exothermic peak temperature means the temperature at which curing is most activated. Exothermic end temperature means the end temperature of curing, and the area of the peak means the heat value.

TABLE 1

| | Silanol compound | Exothermic onset temperature (° C.) | Exothermic peak temperature (° C.) | Total heat value (J/g) |
| --- | --- | --- | --- | --- |
| Example 1 | Triphenylsilanol | 90.4 | 116.3 | 265 |
| Example 2 | Diphenylsilanol | 88.0 | 109.2 | 132 |
| Comparative Example 1 | Dimethoxydiphenyl-silane | 100.5 | 135.0 | 162 |
| Comparative Example 2 | Trimethoxyphenyl-silane | 95.1 | 131.5 | 101 |
| Comparative Example 3 | 3-Glycidoxypropyl-trimethoxysilane | 89.8 | 137.6 | 74 |

As can be seen from Table 1, in Comparative Example 3 in which a conventional silane coupling agent was used, the bisphenol A-type epoxy resin being a glycidyl ether-type epoxy resin was not polymerized.

As can be seen from Table 1 and FIG. 1, in the thermosetting epoxy resins of Examples 1 and 2 in which bulky silanol compounds were used, the exothermic onset temperature and the exothermic peak temperature were shifted to the low temperature side when compared to those of Comparative Examples 1 and 2 in which alkoxyphenylsilane was used. The thermosetting epoxy resins of Examples 1 and 2 were found to exhibit low-temperature fast-curing properties.

EXAMPLES 3 TO 6

10 parts by mass of the aluminum chelate-based latent curing agent of Reference Example 1 and 100 parts by mass of a mixture of triphenylsilanol and bisphenol-A type epoxy resin (EP828, Japan Epoxy Resins Co., Ltd.) mixed in a ratio shown in Table 2 were uniformly mixed to prepare a thermosetting epoxy resin composition. Triphenylsilanol used as the silanol compound was dissolved in the bisphenol A-type epoxy resin under heating at 80° C. for 2 hours before use.

Each of the obtained thermosetting epoxy resin compositions was subjected to thermal analysis using a differential thermal analyzer (DSC) (DSC6200, Seiko Instruments Inc.). The results obtained are shown in Table 2 and FIG. 2. The results of Example 1 are also shown for comparison.

TABLE 2

| | Bisphenol A-type epoxy resin (EP828) | Triphenyl silanol | Exothermic onset temperature (° C.) | Exothermic peak temperature (° C.) | Total heat value (J/g) |
| --- | --- | --- | --- | --- | --- |
| Example 3 | 95 parts by mass | 5 parts by mass | 90.1 | 117.1 | 166 |
| Example 1 | 90 parts by mass | 10 parts by mass | 90.4 | 116.3 | 265 |
| Example 4 | 85 parts by mass | 15 parts by mass | 86.7 | 114.8 | 406 |
| Example 5 | 80 parts by mass | 20 parts by mass | 86.4 | 113.6 | 386 |
| Example 6 | 75 parts by mass | 25 parts by mass | 86.1 | 114.4 | 365 |

Figure 2:
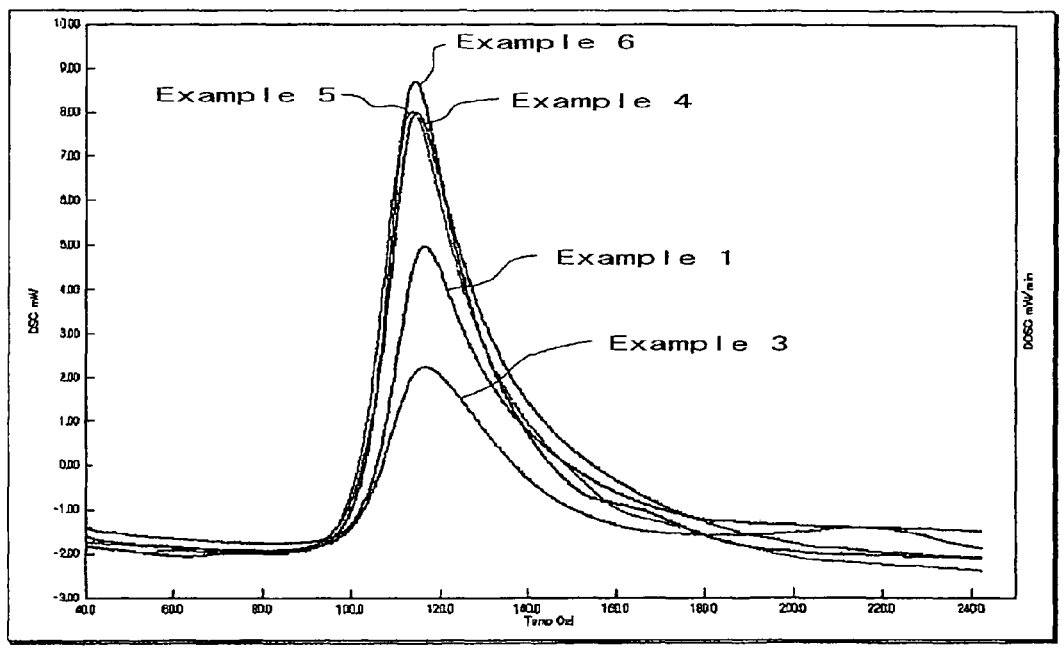
FIG. 2 shows the results of DSC measurement of the thermosetting epoxy resin compositions of Examples 1 and 3 to 6.

As can be seen from Table 2 and FIG. 2, when the amount of triphenylsilanol used was at least in the range of 5 mass % to 30 mass % based on the total amount of triphenylsilanol and bisphenol-A type epoxy resin, the thermosetting epoxy resin compositions were found to exhibit preferred low-temperature fast-curing properties.

EXAMPLE 7

10 parts by mass of the aluminum chelate-based latent curing agent obtained in Reference Example 1 was added to a mixture solution of 40 parts by mass of a 24% solution of aluminum monoacetylacetonate bis(ethylacetoacetate) in isopropanol (Alumichelate D, Kawaken Fine Chemicals Co., Ltd.), 20 parts by mass of triphenylsilanol, and 40 parts by mass of ethanol. The resultant mixture was stirred at 40° C. overnight, and the resultant aluminum chelate-based latent curing agent was collected by filtration and dried to give an aluminum chelate-based latent curing agent impregnated with triphenylsilanol.

10 parts by mass of the resultant aluminum chelate-based latent curing agent, 10 parts by mass of a triphenylsilanol compound, and 90 parts by mass of bisphenol-A type epoxy resin (EP828, Japan Epoxy Resins Co., Ltd.) were uniformly mixed to prepare a thermosetting epoxy resin composition. Triphenylsilanol used as the silanol compound was dissolved in the bisphenol A-type epoxy resin under heating at 80° C. for 2 hours before use.

Figure 3:
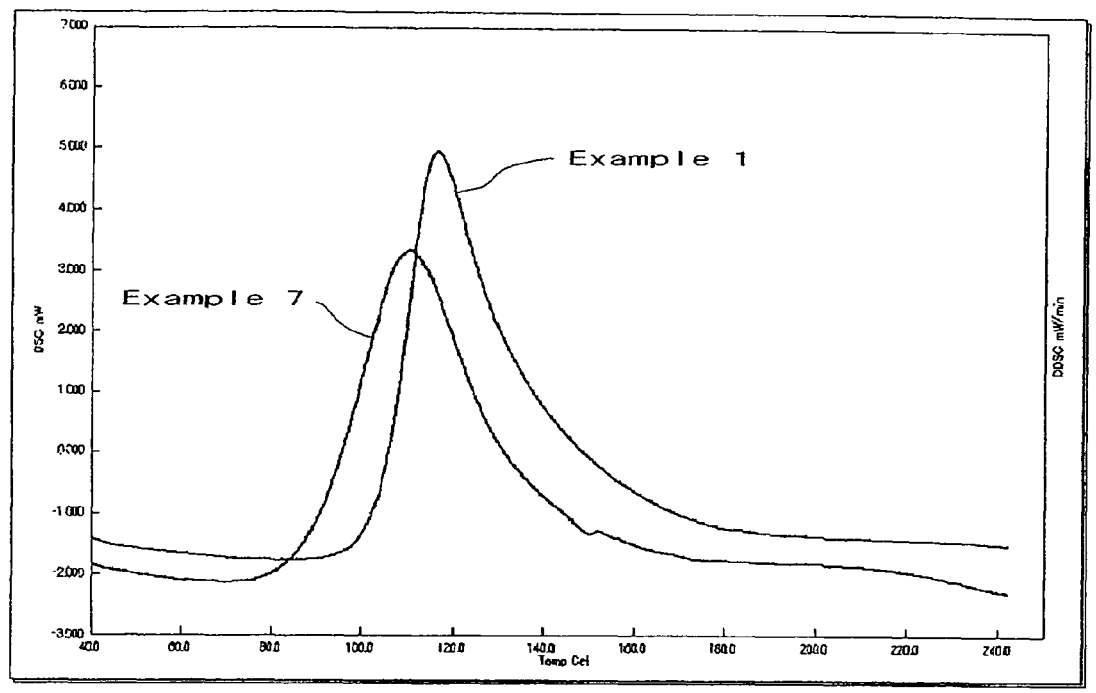
FIG. 3 shows the results of DSC measurement of the thermosetting epoxy resin compositions of Examples 1 and 7.

The obtained thermosetting epoxy resin composition was subjected to thermal analysis using a differential thermal analyzer (DSC) (DSC6200, Seiko Instruments Inc.). The results obtained are shown in Table 3 and FIG. 3. The results of Example 1 are also shown for comparison.

TABLE 3

| | Aluminum chelate-based latent curing agent | Exothermic onset temperature (° C.) | Exothermic peak temperature (° C.) | Total heat value (J/g) |
| --- | --- | --- | --- | --- |
| Example 1 | Non-impregnated type of Reference Example 1 | 90.4 | 116.3 | 265 |
| Example 7 | Impregnated type | 75.5 | 110.3 | 273 |

As can be seen from Table 3, in Example 7 in which the aluminum chelate-based latent curing agent impregnated with triphenylsilanol was used, the low-temperature fast-curing properties were further improved as compared to those of Example 1 in which the aluminum chelate-based latent curing agent not impregnated with triphenylsilanol was used.

EXAMPLES 8 TO 10

10 parts by mass of the aluminum chelate-based latent curing agent of Reference Example 1, 10 parts by mass of triphenylsilanol, and a mixture of bisphenol-A type epoxy resin (EP828, Japan Epoxy Resins Co., Ltd.) and an oxetane compound (di[1-ethyl(3-oxetanyl)]methyl ether, OXT-221, TOAGOSEI CO., LTD.) mixed in a ratio shown in Table 4 were uniformly mixed to prepare a thermosetting epoxy resin composition. Triphenylsilanol used as the silanol compound was dissolved in the bisphenol A-type epoxy resin under heating at 80° C. for 2 hours before use.

Each of the obtained thermosetting epoxy resin compositions was subjected to thermal analysis using a differential thermal analyzer (DSC) (DSC6200, Seiko Instruments Inc.). The results obtained are shown in Table 4 and FIG. 4. The results of Example 1 are also shown for comparison.

TABLE 4

|  | Bisphenol A-type epoxy resin (EP828) | Oxetane compound | Exothermic onset temperature (° C.) | Exothermic peak temperature (° C.) | Total heat value (J/g) |
| --- | --- | --- | --- | --- | --- |
| Example 1 | 90 parts by mass | 0 parts by mass | 90.4 | 116.3 | 265 |
| Example 8 | 72 parts by mass | 18 parts by mass | 77.3 | 105.3 | 288 |
| Example 9 | 63 parts by mass | 27 parts by mass | 75 | 103.2 | 399 |
| Example 10 | 54 parts by mass | 36 parts by mass | 74.4 | 102.2 | 402 |

Figure 4:
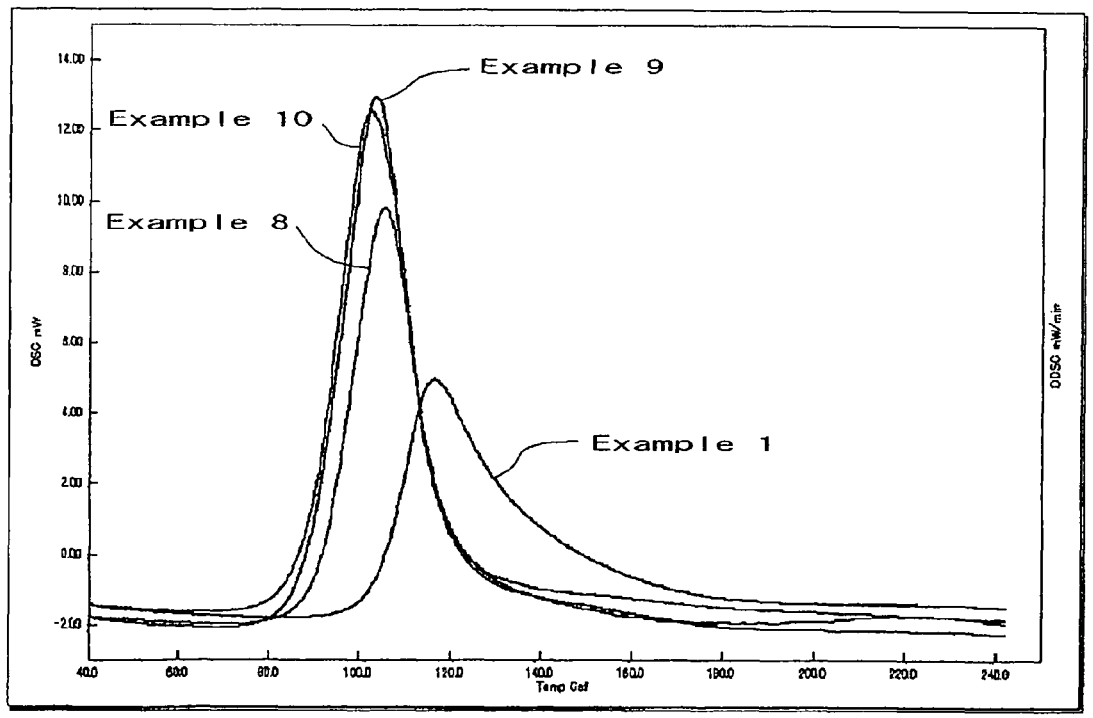
FIG. 4 shows the results of DSC measurement of the thermosetting epoxy resin compositions of Examples 1 and 8 to 10.

As can be seen from Table 4 and FIG. 4, when the oxetane compound was used together with the glycidyl ether-type epoxy resin, the exothermic onset temperature and the exothermic peak temperature were shifted to the low temperature side as compared to those when the oxetane compound was not used, and the exothermic peak was sharper.

EXAMPLE 11

10 parts by mass of the aluminum chelate-based latent curing agent of Reference Example 2, 10 parts by mass of triphenylsilanol, and 90 parts by mass of bisphenol-A type epoxy resin (EP828, Japan Epoxy Resins Co., Ltd.) were uniformly mixed to prepare a thermosetting epoxy resin composition. Triphenylsilanol used as the silanol compound was dissolved in the bisphenol A-type epoxy resin under heating at 80° C. for 2 hours before use.

Figure 5:
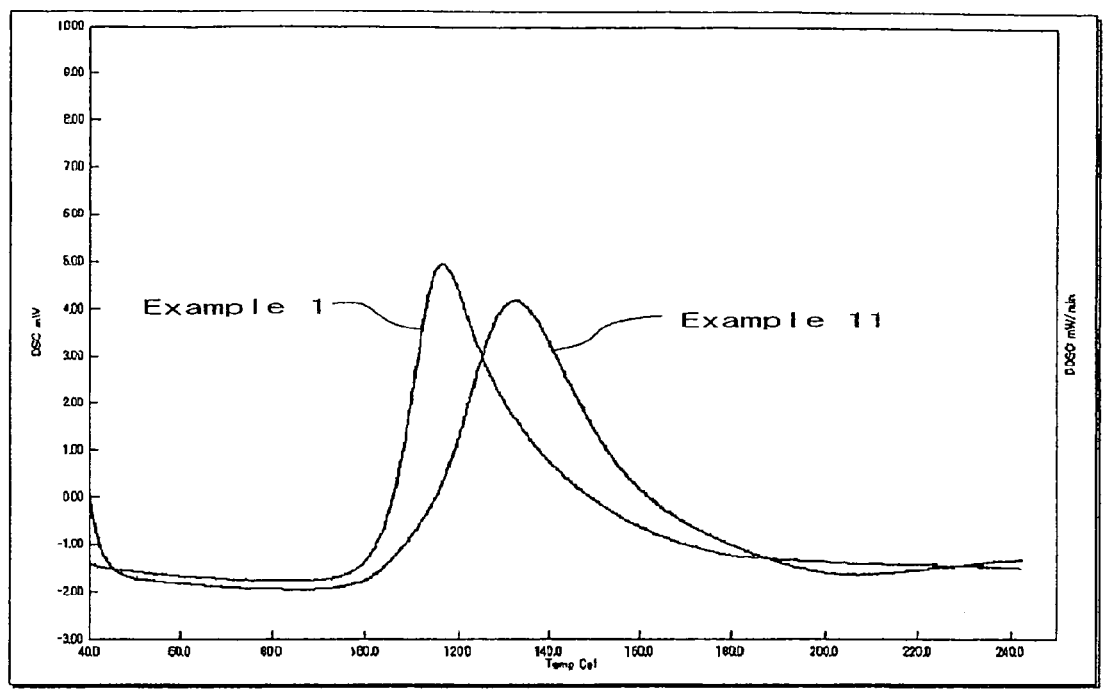
FIG. 5 shows the results of DSC measurement of the thermosetting epoxy resin compositions of Examples 1 and 11.

The obtained thermosetting epoxy resin composition was subjected to thermal analysis using a differential thermal analyzer (DSC) (DSC6200, Seiko Instruments Inc.). The results obtained are shown in Table 5 and FIG. 5. The results of Example 1 are also shown for comparison.

TABLE 5

|  | Aluminum chelate-based latent curing agent | Exothermic onset temperature (° C.) | Exothermic peak temperature (° C.) | Total heat value (J/g) |
| --- | --- | --- | --- | --- |
| Example 1 | Reference Example 1 (with divinylbenzene) | 90.4 | 116.3 | 265 |
| Example 11 | Reference Example 2 (without divinylbenzene) | 92.4 | 132.7 | 279 |

As can be seen from Table 5, when divinylbenzene was used in the interfacial polymerization together with the polyfunctional isocyanate compound (Example 1), the exothermic peak temperature was shifted to the low temperature side as compared to that when divinylbenzene was not used (Example 11). It was found that the use of divinylbenzene can improve the low-temperature fast-curing properties.

INDUSTRIAL APPLICABILITY

Although a thermosetting epoxy resin composition of the present invention contains a general purpose low-cost glycidyl ether-type epoxy resin as an epoxy resin, the thermosetting epoxy resin composition is rapidly cured with an aluminum chelate-based latent curing agent at low temperature. Therefore, the thermosetting epoxy resin composition is useful as a resin composition for an adhesive that can provide low-temperature rapid bonding.

The invention claimed is:

1. A thermosetting epoxy resin composition comprising an aluminum chelate-based latent curing agent, a silanol compound of the formula (A), and a glycidyl ether epoxy resin:

$$(Ar)_m Si(OH)_n \tag{A}$$

wherein Ar is an optionally substituted aryl group, and m is 2 or 3, provided that the sum of m and n is 4, and the aluminum chelate-based latent curing agent is an aluminum chelate-based latent curing agent in which the aluminum chelate agent is held in a porous resin obtained by interfacial polymerization of a polyfunctional isocyanate compound and radical polymerization of a divinylbenzene simultaneously.

2. The thermosetting epoxy resin composition according to claim 1, wherein Ar is a phenyl group.

3. The thermosetting epoxy resin composition according to claim 1, wherein the silanol compound is triphenylsilanol or diphenylsilanol.

4. The thermosetting epoxy resin composition according to claim 1, wherein a ratio of an amount of the silanol compound to a total amount of the silanol compound and the glycidyl ether epoxy resin is in the range of from 5 mass % to 30 mass %.

5. The thermosetting epoxy resin composition according to claim 1, wherein the glycidyl ether epoxy resin is a bisphenol A epoxy resin.

6. The thermosetting epoxy resin composition according to claim 1, further comprising an oxetane compound.

7. The thermosetting epoxy resin composition according to claim 6, wherein the oxetane compound is present in an amount of 10 parts by mass to 100 parts by mass, based on 100 parts by mass of the epoxy resin.

8. The thermosetting epoxy resin composition according to claim 1, wherein the aluminum chelate-based latent curing agent is impregnated with the silanol compound.

* * * * *